(12) United States Patent
Getts

(10) Patent No.: US 11,085,555 B2
(45) Date of Patent: Aug. 10, 2021

(54) HOSE AND CABLE SUPPORT DEVICE

(71) Applicant: Thomas James Getts, Cornelius, NC (US)

(72) Inventor: Thomas James Getts, Cornelius, NC (US)

( * ) Notice: Subject to any disclaimer, the term of this patent is extended or adjusted under 35 U.S.C. 154(b) by 0 days.

(21) Appl. No.: 17/100,962

(22) Filed: Nov. 23, 2020

(65) Prior Publication Data
US 2021/0156494 A1  May 27, 2021

Related U.S. Application Data

(60) Provisional application No. 62/939,679, filed on Nov. 24, 2019.

(51) Int. Cl.
*F16L 3/00* (2006.01)
*B60D 1/62* (2006.01)

(52) U.S. Cl.
CPC . *F16L 3/00* (2013.01); *B60D 1/62* (2013.01)

(58) Field of Classification Search
CPC .................................... F16L 3/00; B60D 1/62
USPC ........................................................ 248/75
See application file for complete search history.

(56) References Cited

U.S. PATENT DOCUMENTS

| | | | |
|---|---|---|---|
| 3,650,545 A | 3/1972 | Freed | |
| 4,465,253 A | 8/1984 | Lang et al. | |
| 4,960,253 A * | 10/1990 | Perrault | F16L 3/22 248/68.1 |
| 5,593,115 A * | 1/1997 | Lewis | F16L 3/227 248/68.1 |
| 5,713,592 A | 2/1998 | Dunell | |
| 6,651,940 B2 * | 11/2003 | Hill, Sr. | B60D 1/62 248/75 |
| 8,511,623 B1 * | 8/2013 | Shiner, Jr. | F16L 3/237 248/49 |
| 8,657,324 B2 * | 2/2014 | Waldner | B60R 16/0215 280/423.1 |
| 9,169,948 B2 * | 10/2015 | Buttars | E03C 1/021 |
| 9,791,073 B2 * | 10/2017 | Witherbee | F16L 3/24 |
| 10,122,157 B1 * | 11/2018 | Gintz | F16L 3/223 |
| 2003/0005517 A1 * | 1/2003 | Randolph | E03C 1/322 4/695 |
| 2003/0136883 A1 * | 7/2003 | Sjoblom | G01F 15/18 248/58 |
| 2004/0056156 A1 * | 3/2004 | Dodson | F16L 3/222 248/59 |

* cited by examiner

Primary Examiner — Muhammad Ijaz
(74) Attorney, Agent, or Firm — Memminger E. Wiggins

(57) ABSTRACT

A multi-component hose and cable support device that provides vertical support to the hoses and cables extending from a tractor to its trailer to prevent such hoses and cables from coming into contact with the tractor, trailer, or any frame components and thereby avoiding damage to such hoses and cables. The present invention comprising first and second elongated support members designed and adapted to be longitudinally coupled to one another via trapezoidal fastener plates and a support member connector plate, a universal head mount, a base mounting assembly having a base mounting member and a vertical base support member, a plurality of anchor fasteners to secure the present invention to the tractor frame, and a plurality of aperture fasteners to connect the various invention components to one another.

8 Claims, 11 Drawing Sheets

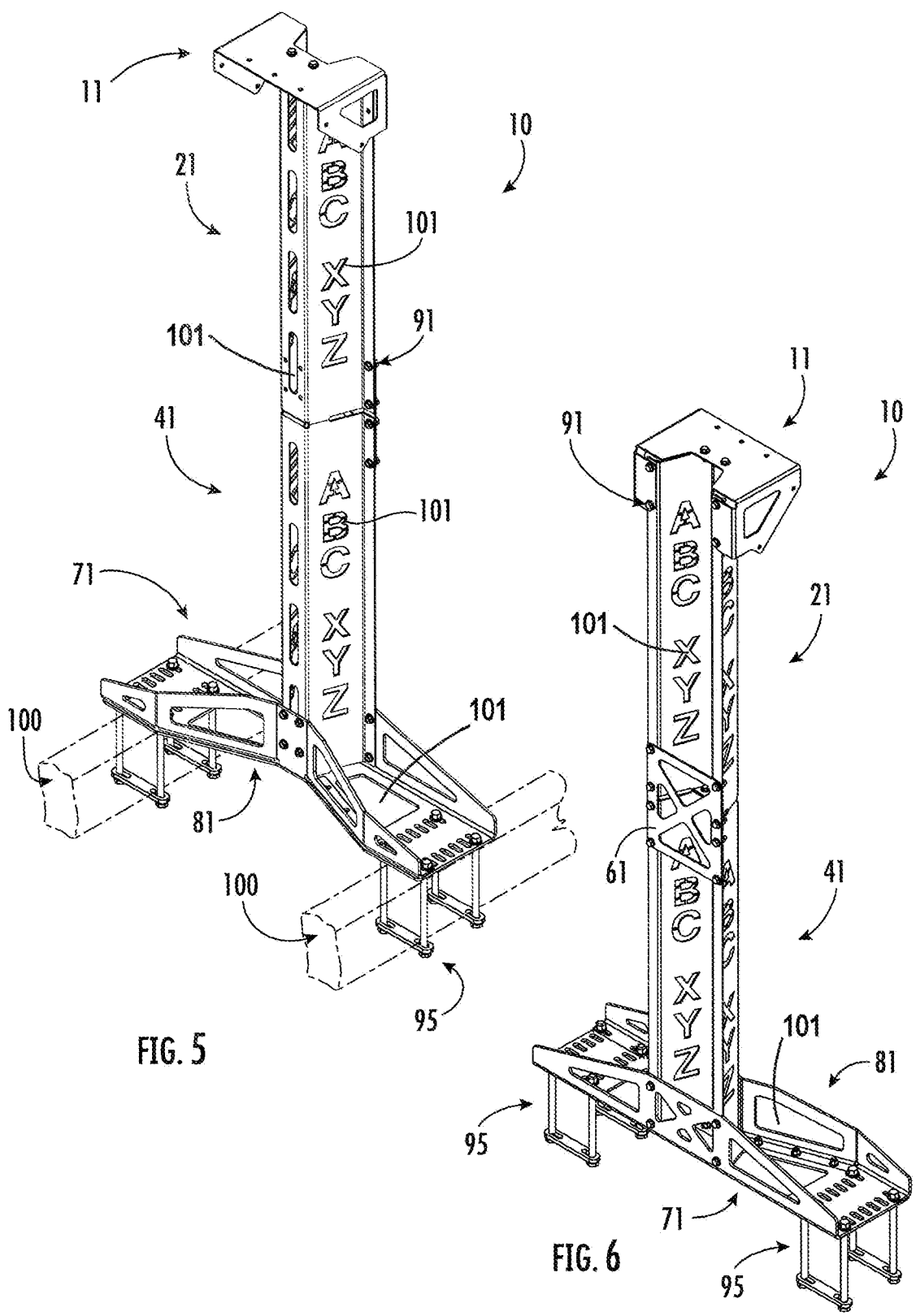

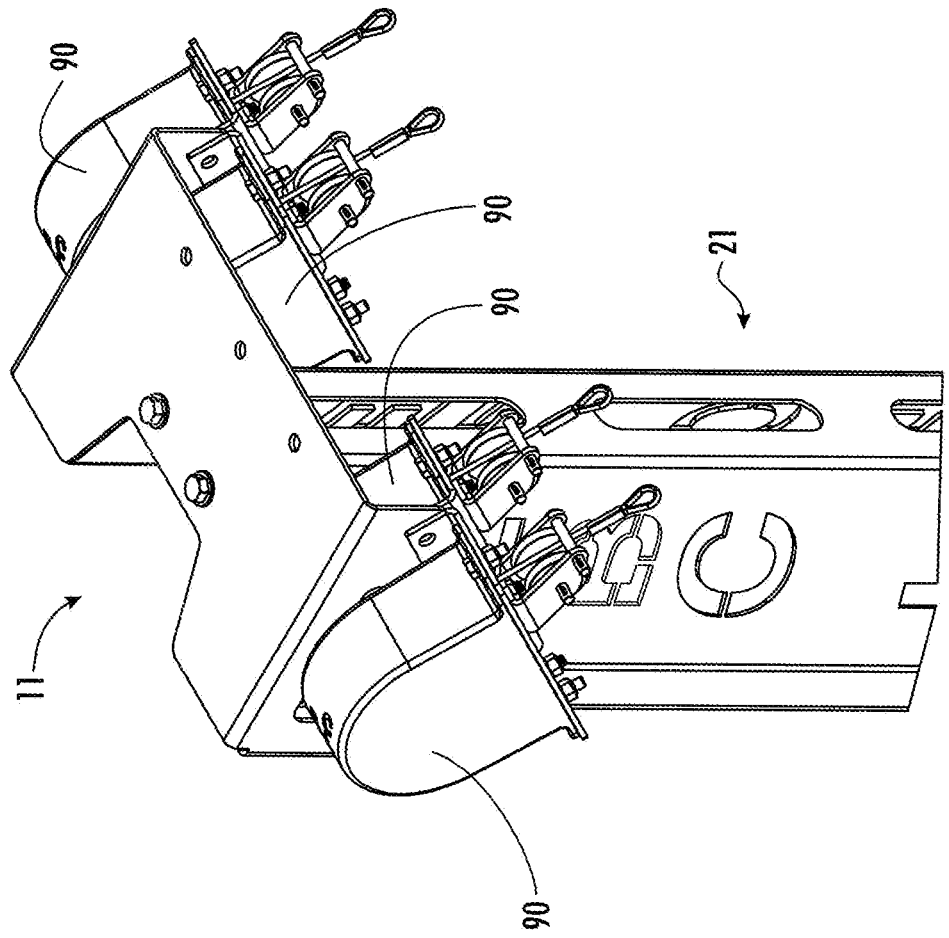
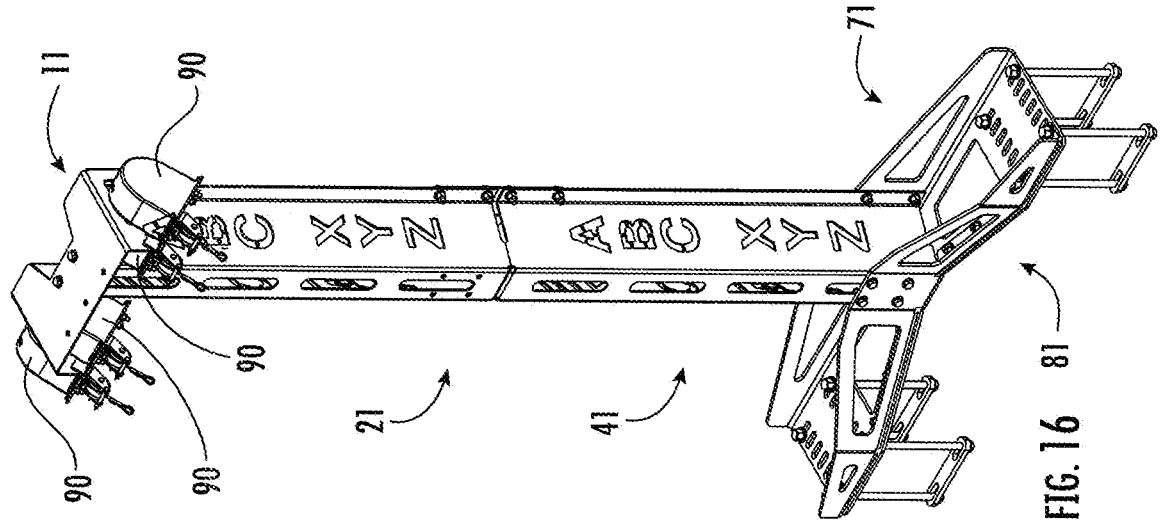

HOSE AND CABLE SUPPORT DEVICE

CROSS-REFERENCE TO RELATED APPLICATIONS

This application claims priority to and incorporates by reference herein U.S. Provisional Patent Application No. 62/939,679 filed on Nov. 24, 2020 and titled "Hose And Cable Support Device".

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO SEQUENCE LISTING, A TABLE, OR A COMPUTER PROGRAM LISTING SUBMITTED ON A COMPACT DISC WITH APPENDIX

Not Applicable.

FIELD OF THE INVENTION

The present invention is directed towards a device designed to manage prevent damage to the various hoses and cables found on tractor-trailer trucks. More specifically, this invention relates to a device that prevents damage to the hoses and cables extending from the tractor to its trailer by providing vertical support to such hoses and cables to prevent their contact with the tractor, trailer, or any frame components of the tractor and the trailer.

BACKGROUND OF THE INVENTION

A tractor-trailer rig has various hoses and cables which extend from the tractor to its connected trailer. Such hoses and cables include brake and other hydraulic hoses as well as electrical cables. In light of the functions these hoses and cables are required to perform they are often long and heavy. A variety of devices are available to provide support and management of these hoses and cables in an attempt to control their movement and thus prevent damage to the hoses and cables. In the event such hoses or cables become damaged, then the safe operation of the tractor-trailer rig may be impacted and thus the possibility of injury to persons or damage property may arise.

Tensioner devices of various types are employed to manage and/or restrict the movement and to provide support of tractor-trailer hoses and cables in an attempt to prevent their damage. Such devices often utilize rubber components and/or extension spring mechanisms. These components are subject to deterioration, rapid fatigue, and wear due to the excessive stretching, bending, and flexing to which they are exposed during the operation of a tractor-trailer. The springs are regularly stretched and stressed and permanently deformed beyond their intended operational range. Additionally, existing hose and cable attachment components of current devices in use require regular, scheduled preventative maintenance because they rapidly wear and thereby become safety concerns.

Accordingly, there remains room for improvement and variation within the art.

SUMMARY OF THE INVENTION

The present disclosure describes at least one embodiment for a vertically mounted hose and cable support device designed and adapted for the guidance, support and safety while allowing the relay of pneumatic, electrical, hydraulic or other forms of energy from fixed sources to moving mechanisms. Additionally, the present invention can be utilized for the mounting of warning lights, accessory lighting, alarms, sirens, public address speakers, or cameras. A rear tractor window protection can also be mounted to the present invention and such window protection can be fabricated from expanded metal, plexiglass or screen. Its function being to protect the tractor rear glass window from being broken from road debris or tractor trailer accessories coming into contact and breaking the glass.

A preferred embodiment of the present invention includes first and second elongated support members designed and adapted to be longitudinally coupled to one another via trapezoidal fastener plates and a support member connector plate. Additionally, a preferred embodiment of the present invention includes a universal head mount, a base mounting assembly having a base mounting member and a vertical base support member, a plurality of anchor fasteners to secure the present invention to the tractor frame, and a plurality of aperture fasteners to connect the various invention components to one another.

In one preferred embodiment of the present invention various components may include structure "cut-outs" that are designed and configured to facilitate, and minimize the cost of, its shipping to the user, but still maintain the structural integrity of the invention. Such "cut-outs" serve to decrease the weight of the present invention thereby reducing the shipping costs to customers. Additionally, the "cut-outs" may be designed as marketing indicia for the owner or user of the subject hose and cable support device.

One aspect of the present invention is to reduce the likelihood of hose or cable failure due to their excessive un-supported movement.

Another aspect of the present invention provides uniform support and guidance for pneumatic hoses, electrical cables or hydraulic hose without kinking, binding and stretching when applied to all hose and cable management applications.

Yet another aspect of the present invention is to elevate and support all hose and cable components vertically to ensure that they do not come into contact with the tractor floor or "cat-walk" and thereby causing their premature failure.

Another aspect of the present invention is to provide a vertically mounted freestanding unit that attaches to the frame rails of any tractor-trailer rig.

Another aspect of the present invention is to keep electrical cords, airlines and hydraulic lines away from the cab of a tractor-trailer rig to eliminate chaffing, rubbing, or banging on the body of the tractor.

Yet another aspect of the present invention is to provide a device capable of mounting a variety of alternative devices and/or components.

Another aspect of the present invention is to provide a modular hose and cable support device to facilitate its shipment, assembly, and installation.

BRIEF DESCRIPTION OF THE DRAWINGS

FIG. 5 is a front perspective view of a fully assembled preferred embodiment for the present invention;

FIG. 6 is a rear perspective view of a fully assembled preferred embodiment for the present invention;

FIG. 16 is a perspective view of one preferred embodiment of the present invention illustrating a tensioner attached to the universal head mount;

FIG. 17 is an enlarged perspective view of one preferred embodiment of the present invention illustrating a tensioner attached to the universal head mount;

DETAILED DESCRIPTION OF THE INVENTION

Figure 1:
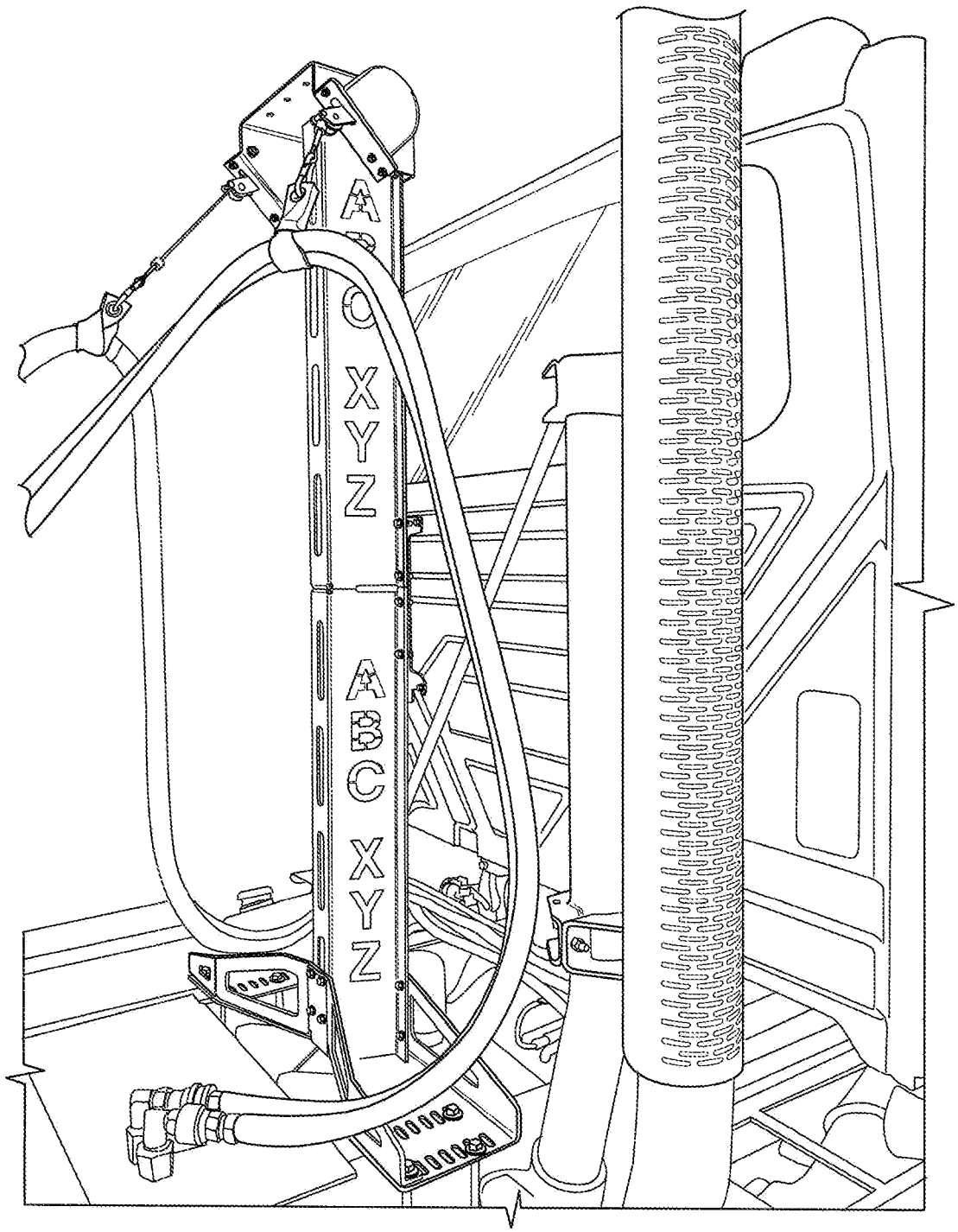
FIG. 1 is an environmental view for a preferred embodiment of the present invention in use.
Figure 4:
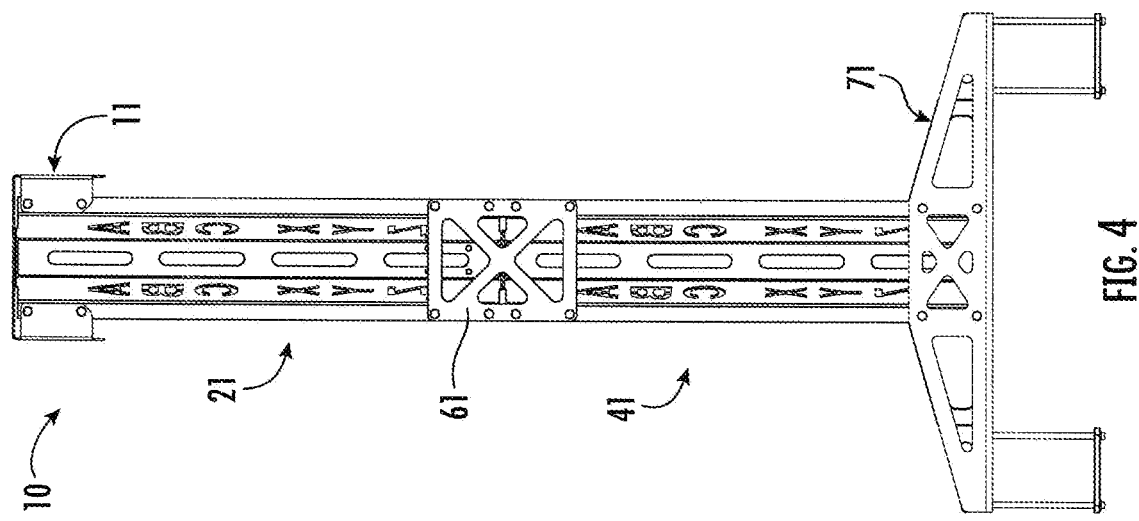
FIG. 4 is a rear elevational view of a fully assembled preferred embodiment for the present invention.
Figure 3:
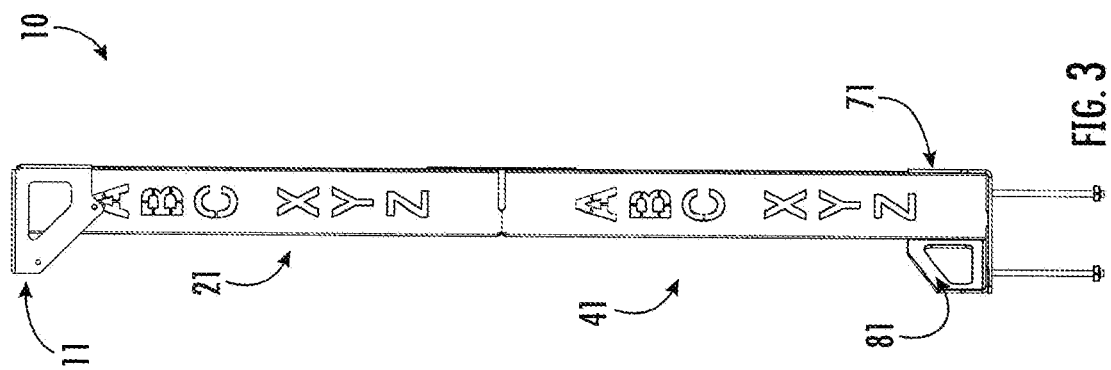
FIG. 3 is a side elevational view of a fully assembled preferred embodiment for the present invention.
Figure 2:
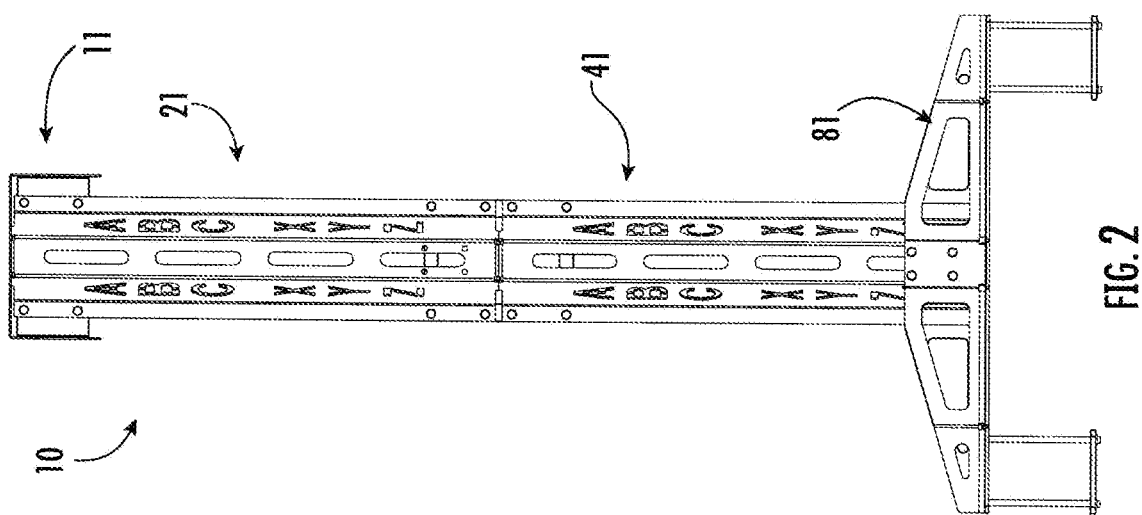
FIG. 2 is a front elevational view of a fully assembled preferred embodiment for the present invention.
Figure 7:
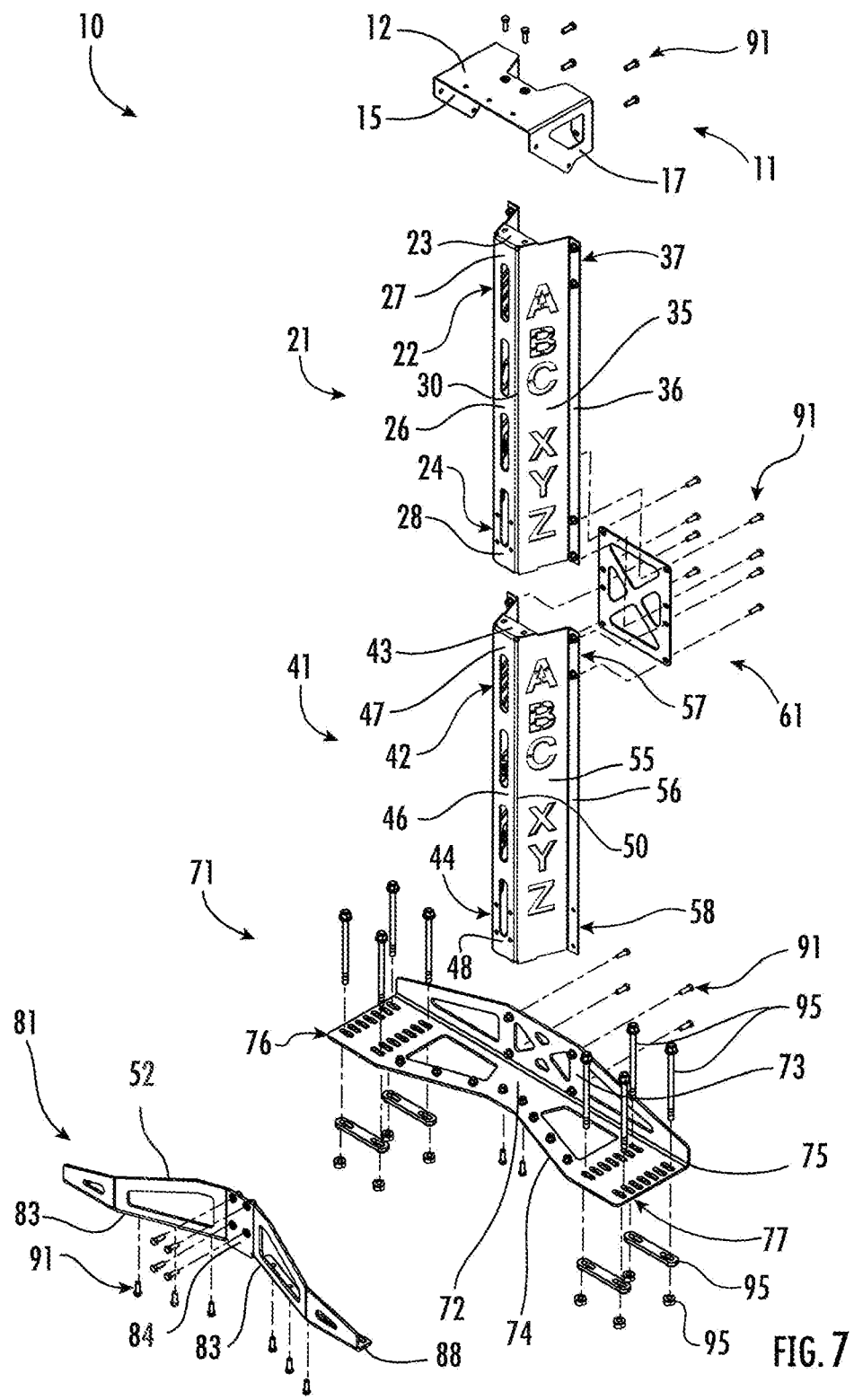
FIG. 7 is an exploded front perspective view illustrating the various components for one preferred embodiment of the present invention.
Figure 8:
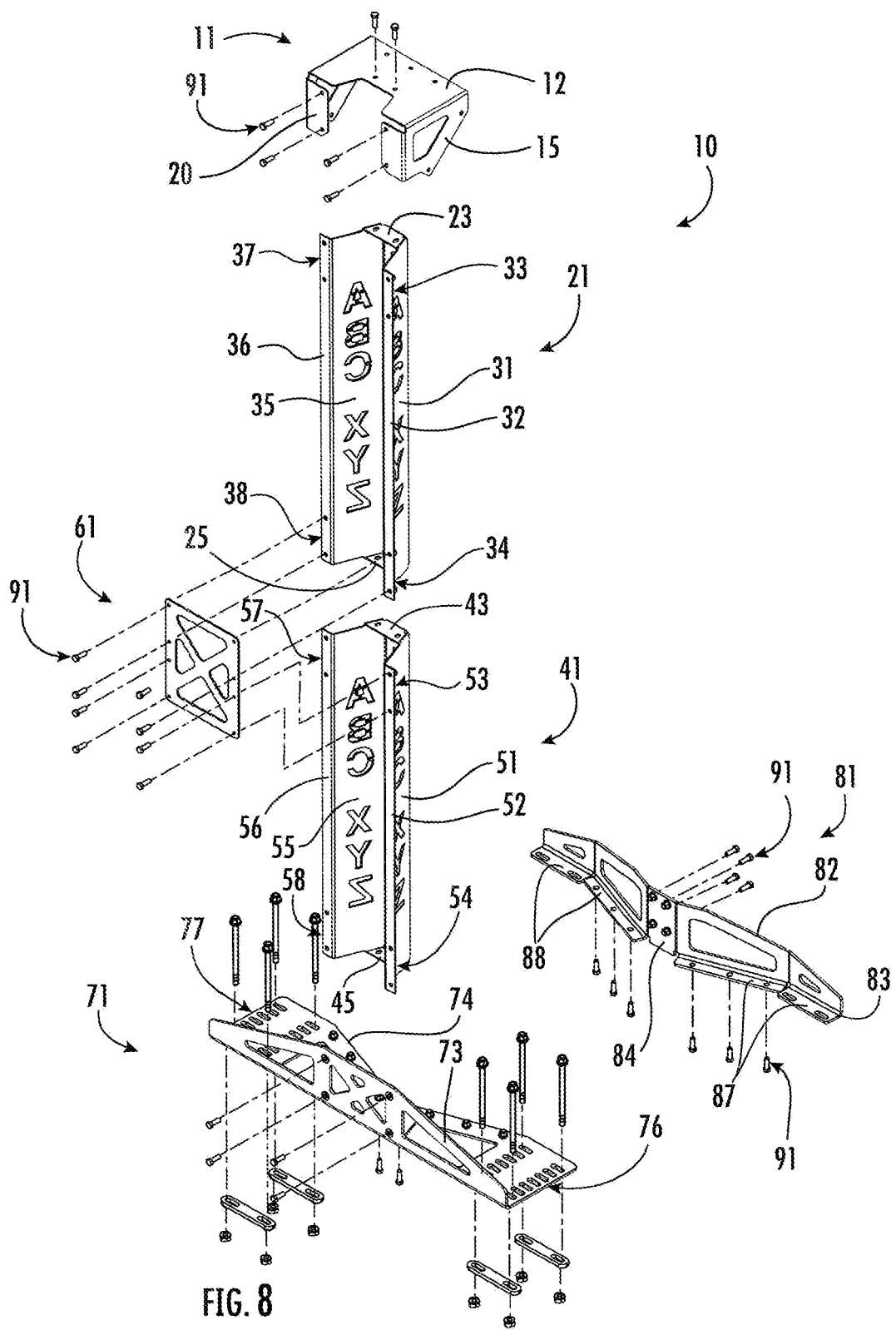
FIG. 8 is an exploded rear perspective view illustrating the various components for one preferred embodiment of the present invention.
Figures 9, 10:
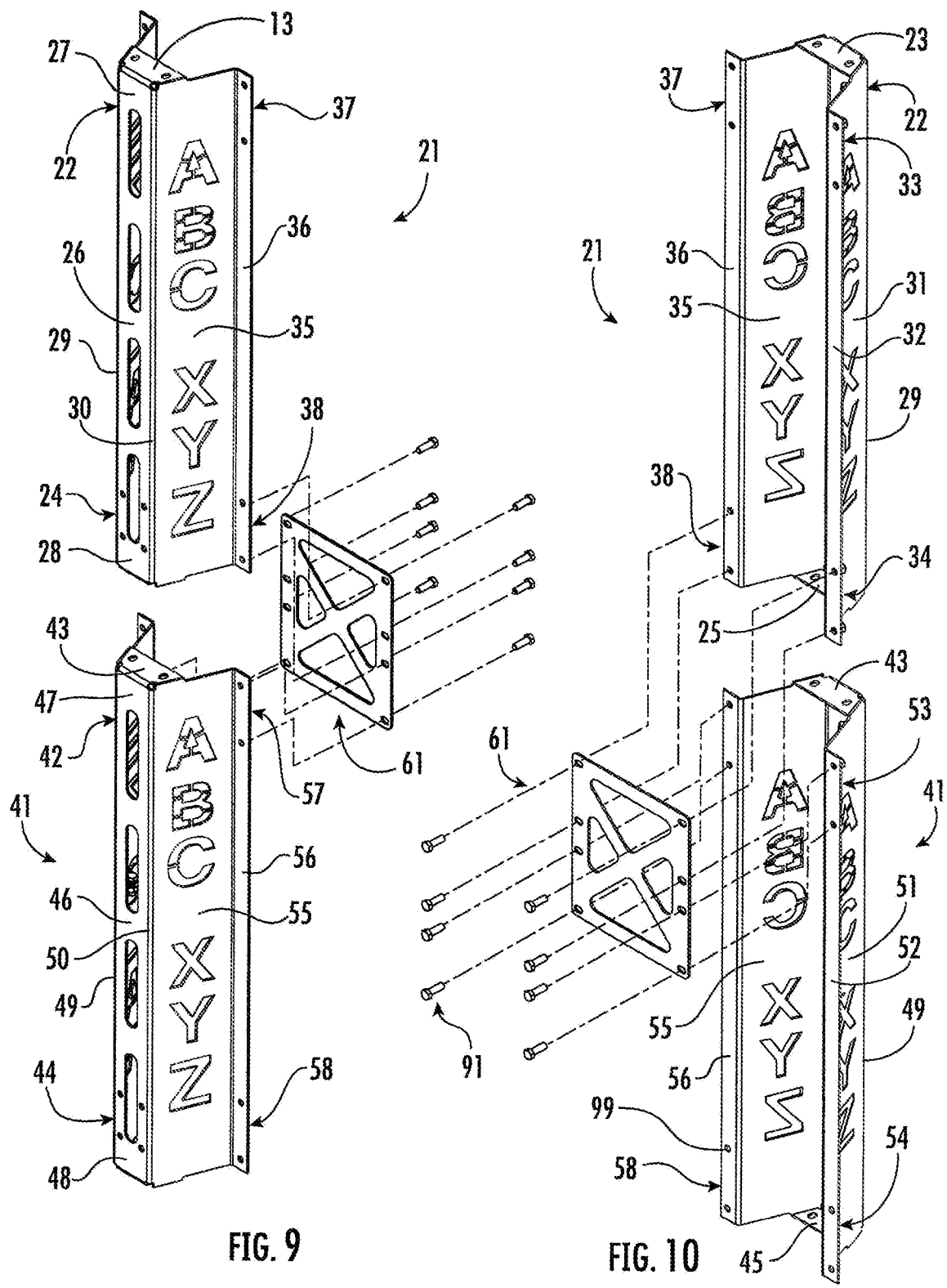
FIG. 9 is an exploded front perspective view illustrating the support member connector plate in relation to the first elongated support member and the second elongated support member of the present invention.
FIG. 10 is an exploded rear perspective view illustrating the support member connector plate in relation to the first elongated support member and the second elongated support member of the present invention.
Figure 11:
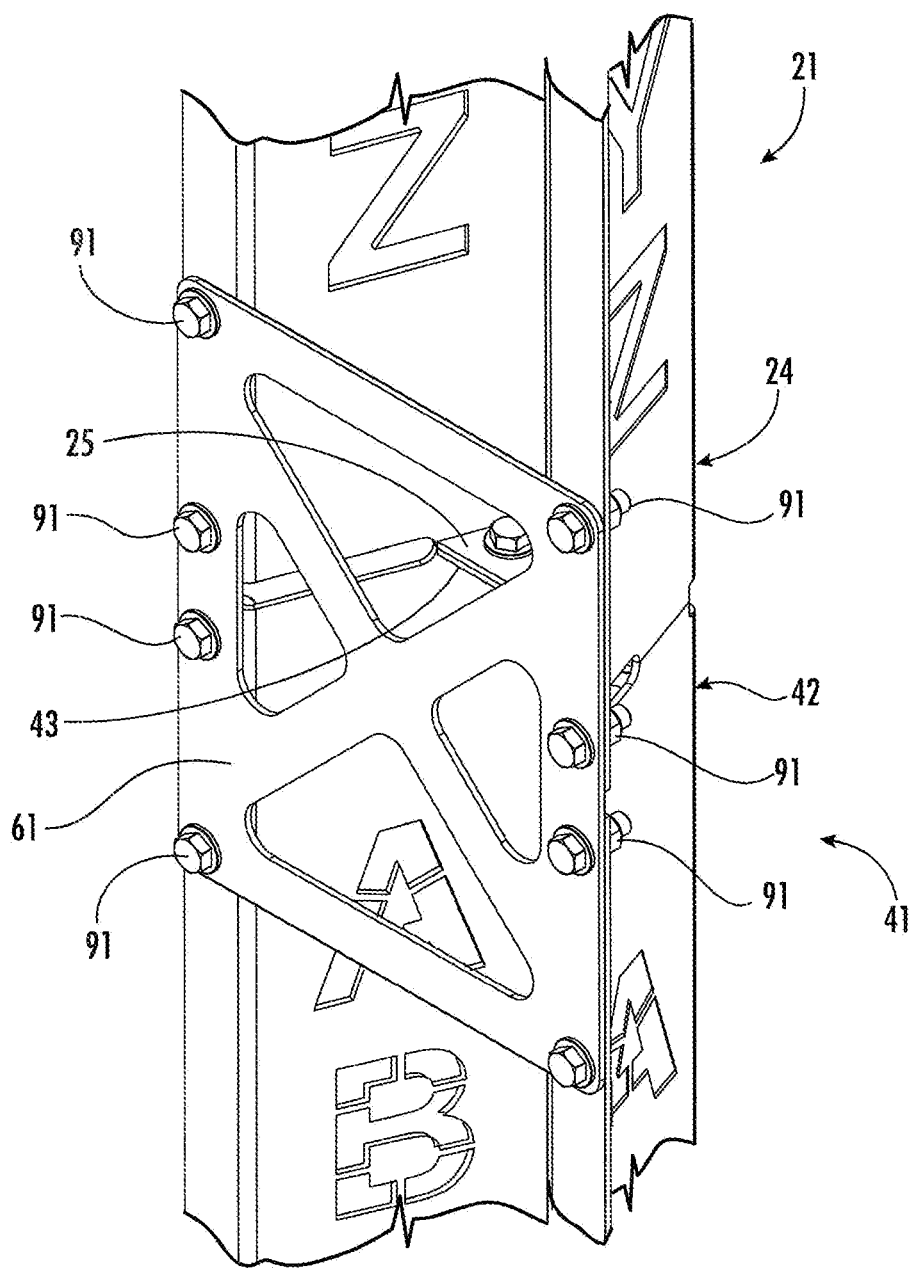
FIG. 11 is a rear perspective view of the support member connector plate of the present invention fastened to the first elongated support member and to the second elongated support member.
Figure 12:
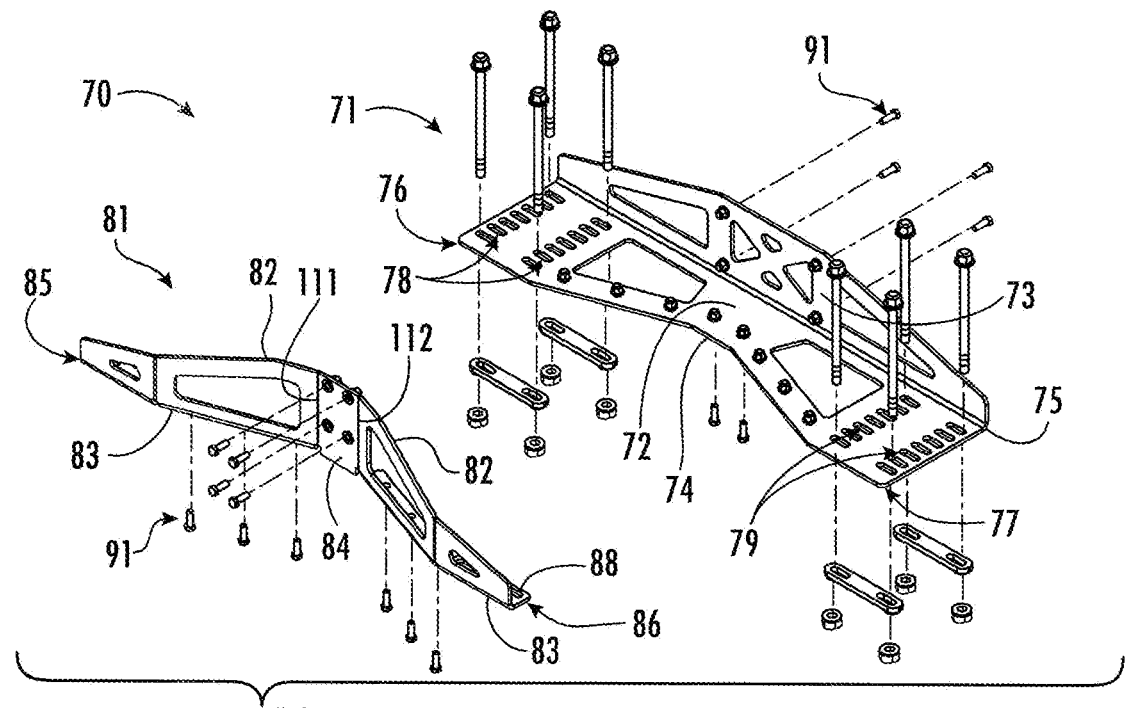
FIG. 12 is an exploded front perspective view of the base mounting assembly for a preferred embodiment of the present invention.
Figure 13:
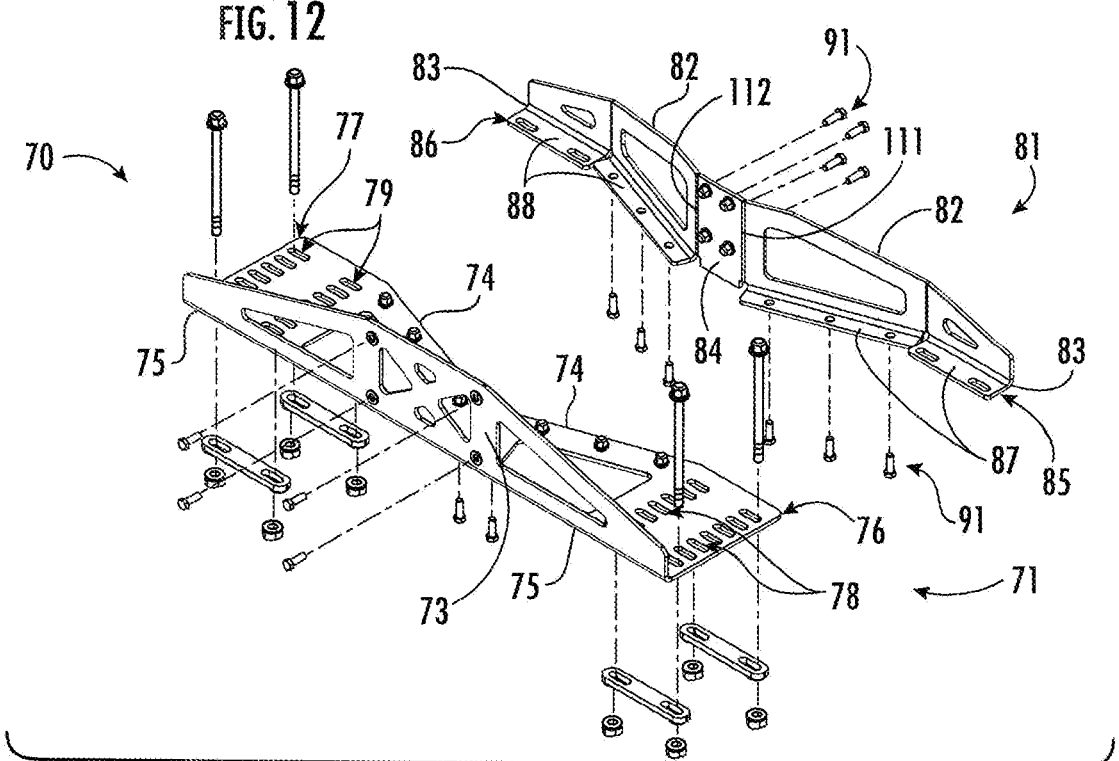
FIG. 13 is an exploded rear perspective view of the base mounting assembly for a preferred embodiment of the present invention.
Figure 14:
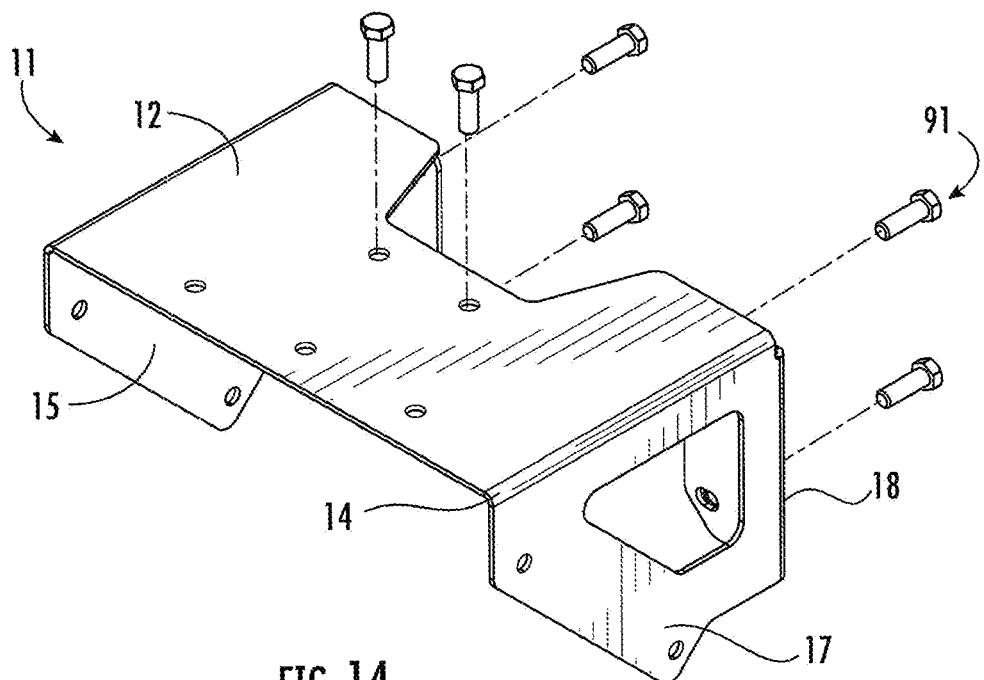
FIG. 14 is a front perspective view of the universal head mount for one preferred embodiment of the present invention.
Figure 15:
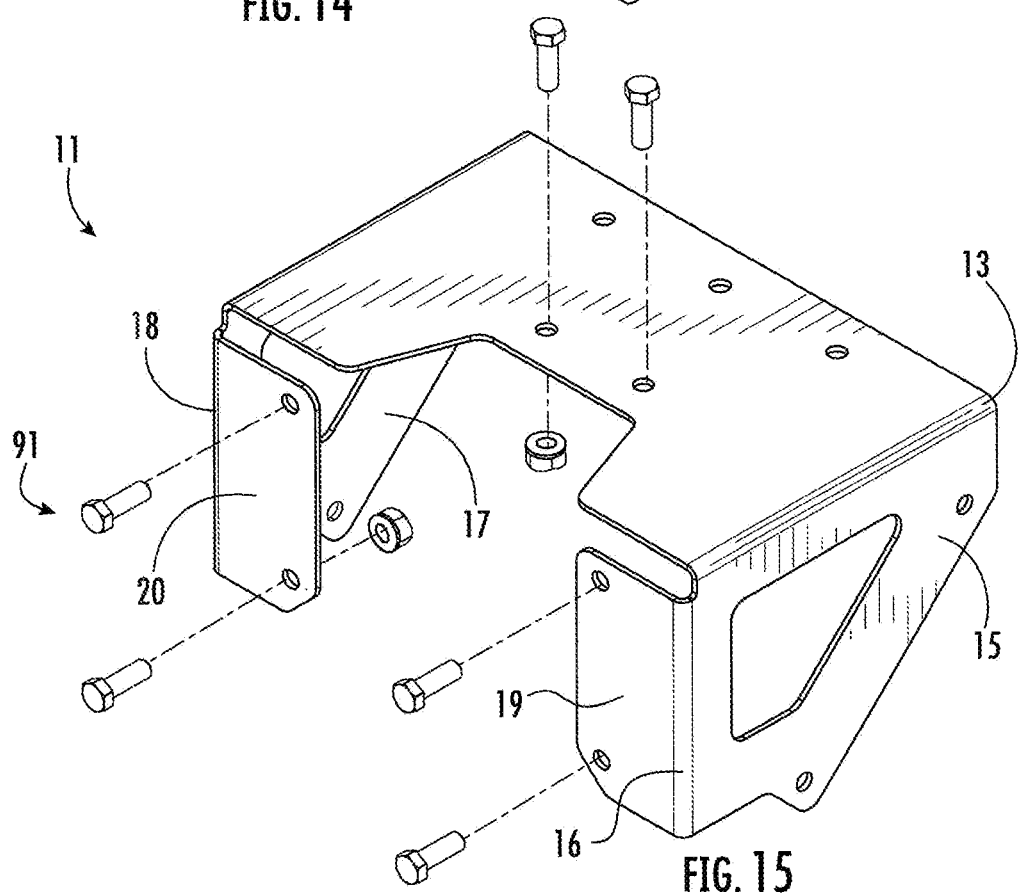
FIG. 15 is a rear perspective view of the universal head mount for one preferred embodiment of the present invention.
Figure 18:
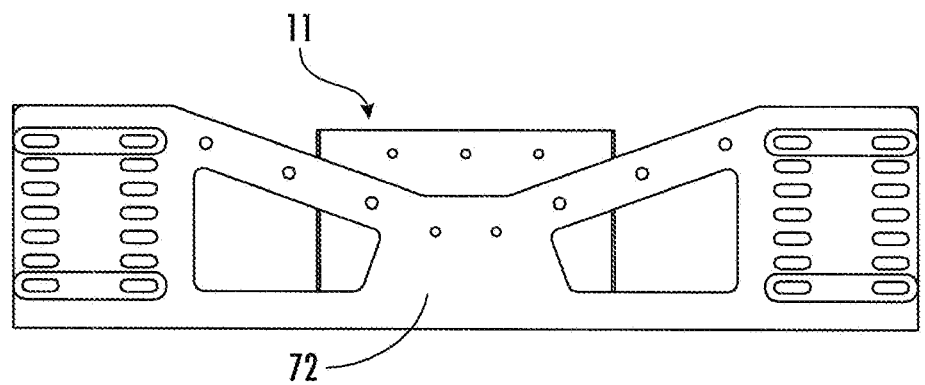
FIG. 18 is a bottom view of one preferred embodiment for the present invention.
Figure 19:
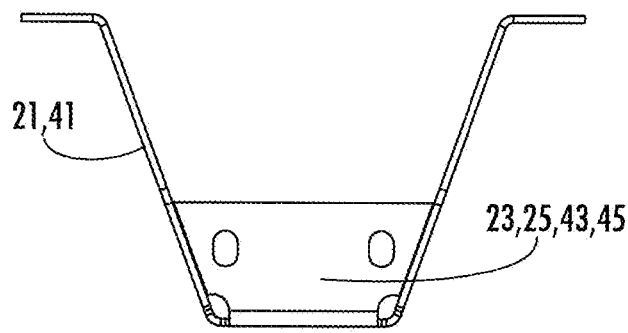
FIG. 19 is a bottom view of the present invention illustrating a trapezoidal fastener plate within an elongated support member.

Prior to referring to the drawings, definitions and explanations are offered to assist the reader in understanding this description.

The "plurality of fastener apertures" as referenced herein means any openings designed, configured, and adapted to receive a fastener for the assembly of the various components of the present invention. All fastener apertures for the present invention are configured, designed, and adapted to receive and/or engage any one of the "plurality of aperture fasteners" or "fastener" as may be referenced in this description. The diameter of the fastener apertures being about 0.405 inches unless otherwise noted. Due to the number of fastener apertures for the present invention numerical labels are not used on the accompanying drawings to identify the location of any particular "aperture" or "plurality of fastener apertures" in order to minimize the number of labelled features appearing on the drawings and therefore reduce any confusion that might arise from an over-abundance of such labelling. Therefore, the presence and location of the fastener apertures for any feature of the present invention is included with the reference to, and the description of, any particular feature of the present invention and as referenced to any applicable figure(s).

A "plurality of aperture fasteners" as referenced herein means any fastener identified in this description for the purpose of insertion within and through the associated "plurality of fastener apertures" to connect, fasten, or couple any component to another component of the present invention for its assembly and use. Generally, there is no preference with regard to the direction in which a fastener may be inserted into and through a fastener aperture as long as such orientation of a particular fastener does not compromise the structural integrity or the functionality of the present invention. However, it is understood that for the purpose of aesthetics and appearance a uniform orientation for the fasteners may be preferred with regard to the completed assembly of the present invention. In a preferred embodiment of the present invention one preferred fastener being a ⅜"—16×1" hex head flange bolt with a self-locking ⅜"—16 flange nut. Such preferred fastener is specifically illustrated in FIG. 20A and as item 91 in FIGS. 7, 8, 10, 11, 12, 13, 14, and 15.

A "plurality of anchor mounting slots" as referenced herein means any of the "slot-like" apertures designed, configured, and adapted to receive any one of the "plurality of anchor fasteners" used when attaching the base mounting assembly 70 of the present invention to the frame of a tractor 100. In a preferred embodiment of the present invention the design and implementation of the "slot" feature of the anchor mounting slot permits the present invention to accommodate tractor frame width variations that might be encountered by a user of the present invention for different tractor models. All anchor mounting slots for the present invention have the same dimensions and are therefore designed and adapted to receive and/or engage any one of the "plurality of anchor fasteners" as may be referenced in this description and/or identified on any referenced drawing singularly or collectively as items 78, 79 as shown on FIGS. 12 and 13.

The "plurality of anchor fasteners" as referenced herein means any anchor fastener identified in this description for the purpose of insertion within and through the "plurality of anchor mounting slots" to connect, fasten, or couple a preferred embodiment of the present invention to the frame of a tractor, 100. In a preferred embodiment of the present invention each anchor fastener comprising a pair bolts wherein each bolt comprising a ½"—13×14" grade 8 rod onto which a ½" nut grade 8 is MiG welded to one end to serve as a bolt head, a pair of ½" USS grade 8 flat washers wherein each washer is placed onto a bolt and positioned adjacent to the bolt head such that the bolt head with washer will engage the anchor mounting slot into which the bolt is inserted, an elongated double slotted washer designed and adapted to span the underside of a tractor frame, and a pair of ½" self-locking grade 8 nuts to be screwed onto each bolt to retain the elongated double slotted washer against the underside of the tractor frame. An alternate preferred anchor fastener comprises a pair of a ½"—13×14" hex head flange bolts with matching self-locking ½"—13 flange nuts and an elongated double slotted washer designed and adapted receive and be retained by its flanged bolt to engage the underside of a tractor frame when attaching the present invention to a tractor. The "slot" feature of the elongated washer permits the anchor fastener to accommodate tractor frame width variations that might be encountered by a user of the present invention for different tractor models. A preferred anchor fastener is specifically illustrated in FIG. 20B and as item 95 in FIGS. 5, 6, and 7.

The singular forms "a", "an" and "the" are intended to include the plural forms as well, unless the context clearly indicates otherwise. It will be further understood that the terms "having", "including", "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

In the description of exemplary embodiments, relative terms such as "lower". "upper", "horizontal", "vertical", "lateral", "above", "below", "up", "down", "top" and "bottom" as well as derivatives thereof (e.g., "horizontally", "downwardly", "upwardly", "inwardly", "perpendicularly") should be construed to refer to the orientation as then described or as shown in the drawing under the discussion.

In describing specific components or elements of the present invention when such component or element is referred to herein as being connected, coupled, or fastened to another component or element it can be directly connected, coupled, or fastened to the to the other component or element or intervening elements that may be present. In contrast, when a component or element is referred to herein as being directly connected, coupled, or fastened to another component or element, there are no intervening components or elements present. Moreover, although the drawings illustrate connection of some components or elements by means of fasteners comprising a bolt and nut, any other fastening means may be used provided such means does not interfere with the operation or structural integrity of the device.

A plurality of aperture fasteners are used to couple the various components of the present invention to one another or to some feature of the tractor. Each fastener comprising a bolt and a nut to engage the threaded end of the bolt. Each fastener having a length and diameter of proper dimensions such that the fastener can engage its intended fastener aperture for the secure coupling of one invention component to another. As described herein the "act of inserting a fastener into a fastener aperture to secure" a particular component of the present invention to another component or to some feature of the tractor (i.e., "a fastener being inserted and secured") should be understood to mean "the proper bolt is inserted through the intended fastener aperture(s) and secured into position with the application of the bolt's companion nut onto the threaded end of the bolt".

Reference will now be made in detail to one exemplary embodiment of the present invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the intended invention. Other objects, features, and aspects of the present invention are disclosed in the following detailed description. It is to be understood by one of ordinary skill in the art that the present discussion is a description of one exemplary embodiment only and is not intended as limiting the broader aspects of the present invention.

In describing the various figures herein, the same reference numbers are used throughout to describe the same material or apparatus, or process pathway. To avoid redundancy, detailed descriptions of much of the apparatus once described in relation to a figure is not repeated in the descriptions of subsequent figures, although such apparatus or process is labeled with the same reference numbers.

A hose and cable support device according to a preferred embodiment of the present inventions comprising various components is illustrated in FIGS. 1 to 20. One exemplary embodiment of the present invention can be generally described as a vertically mounted hose and cable support device designed and adapted for the guidance, support and safety of tractor-trailer hoses and cables while allowing the relay of pneumatic, electrical, hydraulic or other forms of energy from fixed sources to moving mechanisms. Such hose and cable support device comprising a first elongated support member 21 connected longitudinally to a second elongated support member 41, a support member connector plate 61 to vertical structural support to the present invention and connectivity of the first elongated support member 21 to the second elongated support member 41, a universal head mount 11 fastened to the first elongated support member, and a base mounting assembly 70 connecting and securing the second elongated support member to a frame 100 of a tractor trailer truck.

Now referring to FIGS. 1 thru 10 and FIG. 19, in a preferred embodiment of the present invention the first elongated support member 21 includes an upper end 22 defined by a trapezoidal top fastener plate 23 secured within its upper end 22. The trapezoidal top fastener plate 23 comprising a plurality of fastener apertures. Additionally, the first elongated support member 21 includes a lower end 24 that is defined by a trapezoidal bottom fastener plate 25 secured within its lower end 24. Like the trapezoidal top fastener plate 23 of the first elongated support member 21 the trapezoidal bottom plate 25 of the first elongated support member has a plurality of fastener apertures. In light of the first elongated support member's trapezoidal top fastener plate 23 and the trapezoidal bottom fastener plate 25 the first elongated support member 21 has generally an open trapezoidal cross-sectional shape. Such trapezoidal shape provides flat surfaces which facilitates the assembly of the present invention as well as the attachment to and of other components. In a preferred embodiment of the present invention the trapezoidal top and bottom fastener plates 23, 25 are exact duplicates of one another. The parallel sides of the trapezoidal fastener plates having lengths of about 6.5 inches and 2.8 inches and the non-parallel sides each having a length of about 2 inches.

Referring to FIGS. 7, 8, 9, and 10, the first elongated support member 21 also includes a first support member face 26 traversing the length of the first elongated support member 21, a first lateral side 31, a second lateral side 35, a first lateral flange 32, and a second lateral flange 36. In a preferred embodiment of the present invention the first elongated support member 21 has a length of about 36 inches, an open trapezoidal side of about 6.5 inches, and a depth of about 5 inches. The first support member face 26 of the first elongated support member 21 comprising a width of about 3 inches, a left edge 29, a right edge 30, an upper end 27, and a lower end 28. The lower end 28 of the first support member face having a plurality of fastener apertures. The first lateral side 31 of the first elongated support member 21 having a width of about 5 inches and extending angularly from the left edge 29 of the first support member face 26. The second lateral side 35 of the first elongated support member 21 having a width of about 5 inches and extending angularly from the right edge 30 of the first support member face 26. The first lateral flange 32 of the first elongated support member 21 having a width of about 1 inch and extends from the first lateral side 31 of the first elongated support member 21. Said first lateral flange 32 having upper and lower ends 33, 34 with each of the ends comprising a plurality of fastener apertures. The second lateral flange 36 of the first elongated support member 21 having a width of about 1 inch and extends from the second lateral side 35 of the first elongated support member 21. Said second lateral flange 36 having upper and lower ends 37, 38 with each of ends comprising a plurality of fastener apertures.

Now referring to FIGS. 1 thru 10 and FIG. 19, a preferred embodiment of the present invention the second elongated support member 41 is an exact duplicate of and connected longitudinally to the lower end 24 first elongated support member 21. The second elongated support member comprising an upper end 42 defined by a trapezoidal top fastener plate 43 having a plurality of fastener apertures and secured within the upper end 42 of the second elongated support member 41. In the assembly of the present invention the trapezoidal top fastener plate 43 of said upper end 42 of said second elongated support member 41 is fastened to the trapezoidal bottom fastener plate 25 of the lower end 24 of the first elongated support member 21. Additionally, the second elongated support member 41 includes a lower end 44 defined by a trapezoidal bottom fastener plate 45 having a plurality of fastener apertures and secured within the lower end 44 of the second elongated support member 41. In light of the second elongated support member's 41 trapezoidal top fastener plate 43 and the trapezoidal bottom fastener plate 45 the second elongated support member 41 has generally an open trapezoidal cross-sectional shape.

Referring to FIGS. 7, 8, 9, and 10, the second elongated support member 41 also includes a second support member face 46 traversing the length of the second elongated support member 41, a first lateral side 51, a second lateral side 55, a first lateral flange 52, and a second lateral flange 56. The second support member face 46 of the second elongated support member 41 comprising a width of about 3 inches, a left edge 49, a right edge 50, an upper end 47, and a lower end 48. The lower end 48 of the second support member face 46 having a plurality of fastener apertures. The first lateral side 51 of the second elongated support member 41 having a width of about 5 inches and extending angularly from the left edge 49 of the second support member face 46. The second lateral side 55 of the second elongated support member 41 having a width of about 5 inches and extending angularly from the right edge 50 of the second support member face 46. The first lateral flange 52 of the second elongated support member 41 having a width of about 1 inch and extends from the first lateral side 51 of the second elongated support member 41. Said first lateral flange 52 having upper and lower ends 53, 54 with each of the ends comprising a plurality of fastener apertures. The second lateral flange 56 of the second elongated support member 41 having a width of about 1 inch and extends from the second lateral side 55 of the second elongated support member 41. The second lateral flange 56 having upper and lower ends 57, 58 with each of ends comprising a plurality of fastener apertures.

To secure the first elongated support member 21 to the second elongated support member 41 the plurality of fastener apertures of the trapezoidal bottom fastener plate 25 of the first elongated support member 21 are aligned with the plurality of fastener apertures of the trapezoidal top fastener plate 43 of the second elongated support member 41 for insertion and engagement of the aperture fasteners to secure the first elongated support member 21 to the second elongated support member 41.

In a preferred embodiment of the present invention the first and second elongated support members 21, 41 have equal lengths of about 36 inches. However, it is understandable that the first and second elongated support members each may have a length greater or lesser that 36 inches to accommodate larger or smaller tractor trailer rigs for so long as such other vertical heights can safely manage and maintain the hoses and cables of a tractor trailer rig without comprising the structural integrity of the present invention.

Now referring to FIGS. 4, 6 through 11, a preferred embodiment of the present invention includes a support member connector plate 61 having a plurality of fastener apertures. The support member connector plate 61 is designed and adapted to provide upright vertical support to the present invention when the lower end 24 of said first elongated support member 21 is connected to the upper end 42 of said second elongated support member 41. In securing the lower end 24 of said first elongated support member 21 to the upper end 42 of said second elongated support member 41 the plurality of fastener apertures of the support member connector plate 61 are aligned with the plurality of fastener apertures of the lower ends 34, 38 of the first and second lateral flanges 32, 36 of the first elongated support member 21 and the plurality of fastener apertures of the upper ends 53, 57 of the first and second lateral flanges 52, 56 of the second elongated support member 41. Once the alignment of the proper plurality of fastener apertures is completed, a plurality of aperture fasteners are inserted into the aligned plurality of fastener apertures such that the first elongated support member 21 is securely fastened to the second elongated support member 41. In a preferred embodiment of the present invention the support member connector plate is rectangular in shape having a height of about 11 inches and a width of about 9 inches.

Referring to FIGS. 2 through 8 and 14 through 17, a preferred embodiment of the present invention includes a universal head mount 11 fastened to the upper end 22 of the first elongated support member 21. The universal head mount includes a plurality of fastener apertures for connecting the universal head mount 11 to the upper end 22 of the first elongated support member 21 and for the detachable attachment of at least one tensioner 90 for managing and securing the various tractor-trailer hoses and cables. The universal head mount is designed and adapted to detachably attachable other components such as warning lights, accessory lighting, alarms, sirens, public address speakers, cameras, or rear tractor window protection devices.

Continuing to refer to FIGS. 2 through 8 and 14 through 17, the universal head mount 11 comprising a horizontal mounting plate 12 having a plurality of fastener apertures with diameters of about 0.4 inches, a left edge 13, and a right edge 14; a left vertical side mounting plate 15 having a plurality of fastener apertures with diameters about 0.39 inches extends perpendicularly downward from the left edge 13 of the horizontal mounting plate 12; a right vertical side mounting plate 17 having a plurality of fastener apertures with diameters about 0.39 inches extending perpendicularly downward from the right edge 14 of the horizontal mounting plate said 12; a left vertical rear mounting plate 19 having a plurality of fastener apertures with diameters about 0.4 inches extends perpendicularly inward from the left vertical side mounting plate 15, and a right vertical rear mounting plate 20 having a plurality of fastener apertures with diameters about 0.4 inches extending perpendicularly inward from the right vertical side mounting plate 17.

The universal head mount 11 is designed and adapted to be fastened to the trapezoidal top fastener plate 23 of said elongated first support member 21 and to said upper ends 33, 37 of said first and second lateral flanges 32, 36 of said first elongated support member 21. To secure the universal head mount 11 to the upper end 22 of the first elongated support member 21 the plurality of fastener apertures of said trapezoidal top fastener plate 23 are aligned with the corresponding plurality of fastener apertures of the horizontal mounting plate 12 and the plurality of fastener apertures of the left and right vertical side mounting plates 15, 17 are aligned with the plurality of fastener apertures of the upper ends 33, 37 of the first and second lateral flanges 32, 36 of the first elongated support member 21. Once the alignment of the proper of plurality of fastener apertures is completed, a plurality of aperture fasters is inserted into the aligned plurality of fastener apertures such that the universal head mount 11 is securely fastened to the upper end 22 of the first elongated support member 21.

In a preferred embodiment of the present invention the universal head mount has a width of about 12 inches and a depth of about 8 inches. The left and right vertical side mounting plates 15, 16 extending downward a distance of about 6 inches downward at their vertical edges 16, 18. Additionally, the left and right vertical rear mounting plates have a width of about 2.75 inches.

Referring to FIGS. 2 through 8, 12, and 13, a preferred embodiment of the present invention also comprises a base mounting assembly 70 that is designed and adapted to secure the lower end 44 of the second elongated support member 41 of the hose and cable support device 10 to a tractor frame 100. The base mounting assembly 70 includes a base mounting member 71 and a vertical base support member 81. The base mounting member 71 comprising a horizontal support plate 72 having a front edge 74 with a plurality of fastener apertures positioned along the front edge, a back edge 75, a left end 76 having a plurality of anchor mounting slots 78, and a right end 77 having a plurality of anchor mounting slots 79. The base mounting member 71 also comprises a vertical support plate 73 having a plurality of fastener apertures. The vertical support plate 73 extends perpendicularly upward from the back edge 75 of the horizontal support plate 72.

The plurality of fastener apertures of the vertical support plate 73 are configured and adapted for alignment with the plurality of fastener apertures of said lower ends 54, 58 of the first and second lateral flanges 52, 56 of said second elongated support member 41. At least two fastener apertures of the plurality of fastener apertures of the front edge 74 of the horizontal support plate 72 are configured and adapted for alignment with the plurality of the fastener apertures of the trapezoidal bottom fastener plate 45 of the second elongated support member 41. Additionally, the plurality of the anchor mounting slots 78, 79 are configured and adapted to engage a plurality of anchor fasteners 95 to secure said horizontal support plate 72 to the tractor-trailer frame 100.

To secure the lower end 44 of the second elongated support member 41 to the base mounting member 71 the plurality of fastener apertures of the of the lower ends 54, 58 of the first and second lateral flanges 52, 56 of the second elongated support member 41 are aligned with the corresponding plurality of fastener apertures of the vertical support plate 73 and the plurality of the apertures of the trapezoidal bottom fastener plate 45 of the lower end 44 of the second elongated support member 41 are aligned with the corresponding apertures of the front edge 74 of the horizontal support plate 72. Once the apertures of the lower end 44 of the second elongated support member 41 are aligned with the corresponding apertures of the base mounting member 71, the fasteners 91 are inserted accordingly to secure the base mounting member 71 to the lower end 44 of the second elongated support member 41.

In a preferred embodiment of the preferred invention the various measurements of the base mounting member 71 includes a horizontal support plate with a front edge 74 of about 38 inches, a back edge 75 of about 37 inches, left and right ends 76, 77 of about 9 inches, a center width of about 5 inches. Additionally, the vertical support plate 73 of the base mounting member 71 has a top edge of 38 inches and a center vertical height of about 6 inches.

Continuing to refer to FIGS. 2 through 8, 12, and 13, in a preferred embodiment the base mounting assembly 70 of the present invention also includes a vertical base support member 81 that is designed and adapted for attachment to the base mounting member 71 and to the lower end 44 of second support member lower end 41 to provide additional vertical support to the present invention upon securing the second elongated support member 41 to the tractor-trailer frame 100. The vertical base support member 81 includes a top edge 82, a bottom edge 83, a rectangular center face 84 having a plurality of fastener apertures, a left end 85, a right end 86, a left flange 87 extending from the left end 85 to a left edge 111 of said rectangular center face 84, a right flange 88 extending from the right end 86 to a right edge 112 of said rectangular center face 84. The left flange 87 of the vertical base support member includes a pair of anchor mounting slots and a plurality of fastener apertures such that the pair of anchor mounting slots being located proximate to the left end 85 of the left flange 87 of the vertical base support member 81. Additionally, the right flange 88 of the vertical base support member includes a pair of anchor mounting slots and a plurality of fastener apertures with the pair of anchor mounting slots being located proximate to the right end 86 of the right flange 88 of the vertical base support member 81.

The plurality of said center face fastener apertures of the vertical base support member are configured and adapted for alignment with the plurality of fastener apertures of the lower end 48 of the second support member face 46 of said second elongated support member 41. Additionally, the plurality of fastener apertures and anchor mounting slots of the left and right flanges 87, 88 of the vertical base support member 81 are configured and adapted for alignment with the plurality of fastener apertures of the front edge 74 of the horizontal support plate 72 and the plurality of anchor mounting slots 78, 79 of the horizontal support plate 72.

To secure the vertical base support member 81 to the lower end 44 of the second elongated support member 41 and to the horizontal support plate 72 of the base mounting member 71 the fastener apertures of the rectangular center face 84 of the vertical base support member 81 are first aligned with the plurality of fastener apertures of the lower end 48 of the second support member face 46 of the second elongated support member 41. Next, the plurality of fastener apertures of the left and right flanges 87, 88 of the vertical base support member 81 and the pairs of anchor mounting slots of the vertical base support member 81 are aligned with the plurality of fastener apertures and the plurality of the anchor mounting slots 78, 79 of the horizontal support plate of the base mounting member 71. Once proper alignment of the respective plurality of fastener apertures and the anchor mounting slots are achieved, appropriate fasteners and anchor fasteners are inserted through the appropriate plurality of fastener apertures and anchor mounting slots secure subject invention components.

In a preferred embodiment of the present invention the vertical base support member 81 has a top edge 82 having a length of about 39 inches, a bottom edge 83 having a length having a length of about 38 inches, a rectangular center face 84 having a height of about 6 inches and a width of about 3 inches, and left and right flanges 87, 88 having lengths of 17 inches and widths of 1.75 inches.

Figure 20A:
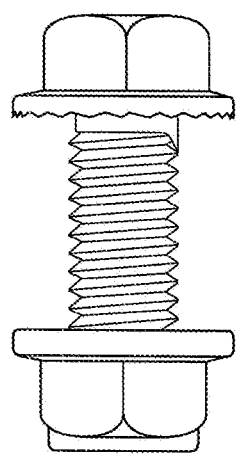
FIG. 20A is an elevation view of an aperture fastener's flange bolt and flange nut for the present invention.
Figure 20B:
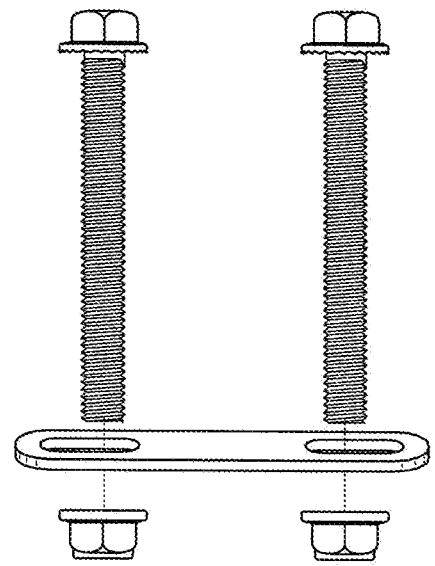
FIG. 20B is an elevation view of an anchor fastener's components for the present invention.

Now referring to FIGS. 20A and 20B, a preferred embodiment of the present invention includes a plurality of aperture fasteners 91 each fastener comprising a ⅜"-16×1" hex head flange bolt and a self-locking ⅜"—16 flange nut. The plurality of aperture fasteners being designed and adapted to engage the plurality of fastener apertures to secure the first elongated support member 21 to the second elongated support member 41; to secure the support member connector plate 61 to the first elongated support member 21 and to the second elongated support member 41; to secure the universal head mount 11 to the upper end 22 of the first elongated support member 21; to secure the second elongated support member 41 to the base mounting assembly 70; and to secure the base mounting member 71 to the vertical base support member 81.

Additionally, a preferred embodiment of the present invention includes a plurality of anchor fasteners 95 designed and adapted to engage the plurality anchor mounting slots located on the base mounting member 71 and on the vertical base support member 81 of the present invention 10. In a preferred embodiment of the present invention each anchor fastener comprising a pair bolts wherein each bolt comprising a ½"—13×14" grade 8 rod onto which a ½" nut grade 8 is MiG welded to one end to serve as a bolt head, a pair of ½" USS grade 8 flat washers wherein each washer is placed onto a bolt and positioned adjacent to the bolt head such that the bolt head with washer will engage the anchor mounting slot into which the bolt is inserted, an elongated double slotted washer designed and adapted to span the underside of a tractor frame, and a pair of ½" self-locking grade 8 nuts to be screwed onto each bolt to retain the elongated double slotted washer against the underside of the tractor frame. An alternate preferred anchor fastener comprises a pair of a ½"—13×14" hex head flange bolts with matching self-locking ½"—13 flange nuts and an elongated double slotted washer designed and adapted receive and be retained by its flanged bolt to engage the underside of a tractor frame when attaching the present invention to a tractor.

In one preferred embodiment of the present invention, a hose and cable support device, includes the various components as illustrated in FIGS. 1 to 20. In accordance with such preferred embodiment the present invention being manufactured in a manner and method which reduces the costs typically associated with the shipping and distribution of the present invention to its users. Various components of the present invention may include "cut-outs" 101 as specifically labeled in FIGS. 5 and 6, and as otherwise generally shown on the various drawings provided in FIGS. 1 through 18, to reduce the weight of the present invention and the total amount of material needed for its manufacture. Although a component may include a "cut-out", such "cut-out" generally provides no functionality to the present invention and is designed such that the structural integrity of the present invention is not compromised in any manner. The geometric shape of the "cut-outs" incorporated into the manufacture of the present invention varies from component to component depending on the component's physical and functional requirements such as, but not limited to, the features, functions, size, shape, weight, and structural integrity-required for such component. Depending on a particular embodiment of the present invention a "cut-out" may, or may not, be ornamental in nature or serve as marking indicia.

A preferred embodiment of the present invention, a hose and cable support device, is manufactured from mild steel, or such other metal capable of providing the required structural integrity for the invention to perform its required function. The application of an exterior finish, such as zinc tri clear plating and powder coating, to the steel, or such other metal, is desired to protect the present invention from corrosion and to prolong its useful life. Additionally, the present invention is designed and adapted to support 25 to 160 pounds of pneumatic hoses, electrical cables and/or hydraulic hoses.

Although preferred embodiments of the present invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged either in whole, or in part. Therefore, the spirit and scope of the invention should not be limited to the description of the preferred embodiments contained herein.

What is claimed is:
1. A hose and cable support device comprising:
    a first elongated support member having a length comprising
        a first upper end defined by a first trapezoidal top fastener plate disposed therein, said first trapezoidal top fastener plate having a first pair of fastener apertures, and
        a first lower end defined by a first trapezoidal bottom fastener plate disposed therein, said first trapezoidal bottom plate having a second pair of fastener apertures,
        wherein said first elongated support member having generally an open trapezoidal cross-sectional shape;
    a second elongated support member having a length equal to said length of said first elongated support member and being connected longitudinally to said first lower end of said first elongated support member comprising
        a second upper end defined by a second trapezoidal top fastener plate disposed therein, said second trapezoidal top fastener plate having a third pair of fastener apertures, said second trapezoidal top fastener plate of said second upper end of said second elongated support member being aligned and fastened to said first trapezoidal bottom fastener plate of said first lower end of said first elongated support member, and a second lower end defined by a second trapezoidal bottom fastener plate disposed therein, said second trapezoidal bottom fastener plate having a fourth pair of fastener apertures, wherein said second elongated support member having generally an open trapezoidal cross-sectional shape;

a support member connector plate having a first plurality of fastener apertures, said support member connector plate designed and adapted to provide upright vertical support when connecting said first lower end of said first elongated support member to said second upper end of said second elongated support member;

a universal head mount having a second plurality of fastener apertures designed and adapted to be fastened to said first upper end of said first elongated support member, wherein at least one tensioner being attached to said universal head mount;

a base mounting assembly comprising a base mounting member having a third plurality of fastener apertures and a first plurality of anchor mounting slots and a vertical base support member having a fourth plurality of fastener apertures and a second plurality of anchor mounting slots, said base mounting assembly secures said second elongated support member of said hose and cable support device to a tractor frame;

a first plurality of aperture fasteners designed and adapted to engage said second pair of fastener apertures of said first trapezoidal bottom fastener plate and said third pair of fastener apertures of said second trapezoidal top fastener plate to secure said first lower end of said first elongated support member to said second upper end of said second elongated support member, wherein each of said first plurality of aperture fasteners comprising a flange bolt and a flange nut;

a second plurality of aperture fasteners to engage said first plurality fastener apertures to secure said support member connector plate to said first lower end of said first elongated support member and to said second upper end of said second elongated support member, wherein each of said second plurality of aperture fasteners comprising a flange bolt and a flange nut;

a third plurality of aperture fasteners to engage said second plurality of fastener apertures to secure said universal head mount to said first upper end of said first elongated support member, wherein each of said third plurality of aperture fasteners comprising a flange bolt and a flange nut;

a fourth plurality of aperture fasteners to engage said third plurality of fastener apertures to secure said second lower end of said second elongated support member to said base mounting member, wherein each of said fourth plurality of aperture fasteners comprising a flange bolt and a flange nut;

a fifth plurality of aperture fasteners to engage said fourth plurality of fastener apertures to secure said base mounting member of said base mounting assembly to said vertical base support member of said base mounting assembly, wherein each of said fifth plurality of aperture fasteners comprising a flange bolt and a flange nut; and a first plurality of anchor fasteners designed and adapted to engage said first plurality of anchor mounting slots and said second plurality of anchor mounting slots of said base mounting assembly to secure said hose and cable support device to said tractor frame.

2. The hose and cable support device of claim 1, wherein said first elongated support member further comprising a first support member face having a width and traversing said length of said first elongated support member, said first support member face having first support member face upper and lower ends, said first support member face lower end of said first support member face having a fifth plurality of fastener apertures;

a first first lateral side having a width and extending angularly from a first left edge of said first support member face;

a first second lateral side having a width and extending angularly from a first right edge of said first support member face;

a first first lateral flange having a width and extending from said first first lateral side, said first first lateral flange having first first lateral flange upper and lower ends, said first first lateral flange upper end comprising a sixth plurality fastener apertures and said first first lateral flange lower end comprising a seventh plurality of fastener apertures; and a first second lateral flange having a width and extending from said first second lateral side, said first second lateral flange having first second lateral flange upper and lower ends, said first second lateral flange upper end comprising an eighth plurality of fastener apertures and said first second lateral flange lower end comprising a ninth plurality of fastener apertures.

3. The hose and cable support device of claim 1, wherein said second elongated support member being connected longitudinally to said first lower end of said first elongated first support member further comprising a second support member face having a width and traversing said length of said second elongated support member, said second support member face having second support member face upper and lower ends, said second support member face lower end of said second support member face having a tenth plurality of fastener apertures;

a second first lateral side having a width and extending angularly from a second left edge of said second support member face;

a second second lateral side having a width extending angularly from a second right edge of said second support member face;

a second first lateral flange having a width and extending from said second first lateral side, said second first lateral flange having second first lateral flange upper and lower ends, said second first lateral flange upper end comprising an eleventh plurality of fastener apertures and said second first lateral flange lower end comprising a twelfth plurality of fastener apertures; and a second second lateral flange having a width and extending from said second second lateral side, said second second lateral flange having second second lateral flange upper and lower ends, said second second lateral flange upper end comprising a thirteenth plurality of fastener apertures and said second second lateral flange lower end comprising a fourteenth of plurality fastener apertures.

4. The hose and cable support device of claim 1, wherein said support member connector plate designed and adapted to be secured to said first first lateral flange lower end and said first second lateral flange lower end of said first elongated support member and to said second first lateral flange upper end and said second second lateral flange upper end of said second elongated support member.

5. The hose and cable support device of claim 1, wherein said universal head mount having a horizontal mounting plate having a fifteenth plurality of fastener apertures and comprising a horizontal mounting plate left edge and a horizontal mounting plate right edge, wherein said fifteenth plurality of fastener apertures being a portion of said second plurality of fastener apertures of said universal head mount;

a left vertical side mounting plate extending perpendicularly downward from said horizontal mounting plate left edge of said horizontal mounting plate, said left vertical side mounting plate having a sixteenth plurality of fastener apertures, wherein said sixteenth plurality of fastener apertures being a portion of said second plurality of fastener apertures of said universal head mount;

a right vertical side mounting plate extending perpendicularly downward from said horizontal mounting plate right edge of said horizontal mounting plate, said right vertical side mounting plate having a seventeenth plurality of fastener apertures, wherein said seventeenth plurality of fastener apertures being a portion of said second plurality of fastener apertures of said universal head mount;

a left vertical rear mounting plate extending perpendicularly inward from said left vertical side mounting plate, said left vertical rear mounting plate having an eighteenth plurality of fastener apertures, wherein said eighteenth plurality of fastener apertures being a portion of said second plurality of fastener apertures of said universal head mount; and a right vertical rear mounting plate extending perpendicularly inward from said right vertical side mounting plate, said right vertical rear mounting plate having a nineteenth plurality of fastener apertures, wherein said nineteenth plurality of fastener apertures being a portion of said second plurality of fastener apertures of said universal head mount.

6. The hose and cable support device of claim 1, wherein said base mounting member of said base mounting assembly comprising a horizontal support plate having a horizontal support plate front edge having a twentieth plurality of fastener apertures, a horizontal support plate back edge, a horizontal support plate left end having a third plurality of anchor mounting slots, and a horizontal support plate right end having a fourth plurality of anchor mounting slots, wherein said twentieth plurality of fastener apertures of said horizontal support plate front edge being a portion of said third plurality of fastener apertures of said base mounting member, wherein said third plurality of anchor mounting slots of said horizontal support plate left end and said fourth plurality of anchor mounting slots of said horizontal support plate right end being a portion of said first plurality of anchor mounting slots of said base mounting member, and a vertical support plate having a twenty-first plurality of fastener apertures, said vertical support plate extending perpendicularly upward from said horizontal support plate back edge of said horizontal support plate, said twenty-first plurality of fastener apertures being a portion of said third plurality of fastener apertures of said base mounting member, wherein said twenty-first plurality of fastener apertures of said vertical support plate configured and adapted for alignment with said twelfth plurality of fastener apertures of said second first lateral flange lower end and said fourteenth plurality of fastener apertures of said second second lateral flange lower end of said second elongated support member, wherein at least two fastener apertures of said twentieth plurality of fastener apertures of said horizontal support plate front edge of said horizontal support plate being configured and adapted for alignment with said fourth pair of fastener apertures of said second trapezoidal bottom fastener plate of said second elongated support member, and wherein said third plurality of anchor mounting slots of said horizontal support plate left end of said horizontal support plate and said fourth plurality of anchor mounting slots of said horizontal support plate right end of said horizontal support, plate being configured and adapted to engage said first plurality of anchor fasteners to secure said horizontal support plate to said tractor frame.

7. The hose and cable support device of claim 1, wherein said vertical base support member of said base mounting assembly comprising a vertical base support member top edge;

a vertical base support member bottom edge;

a vertical base support member rectangular center face having a twenty-second plurality of fastener apertures;

a vertical base support member left end;

a vertical base support member right end;

a vertical base support member left flange being perpendicular to said vertical base support member bottom edge extending from the vertical base support member left end of said vertical base support member to a vertical base support member rectangular center face left edge of said vertical base support member rectangular center face, said vertical base support member left flange having a pair of left flange anchor mounting slots and a twenty-third plurality of fastener apertures, said pair of left flange anchor mounting slots located proximate to said vertical base support member left end of the vertical base support member and said twenty-third plurality of fastener apertures being proximate to said vertical base support member rectangular center face left edge of said vertical base support member rectangular center face; and a vertical base support member right flange being perpendicular to said vertical base support member bottom edge extending from the vertical base support member right end of the vertical base support member to a vertical base support member rectangular center face right edge of said vertical base support member rectangular center face, said vertical base support member right flange having a pair of right flange anchor mounting slots and a twenty-fourth plurality of fastener apertures, said pair of right flange anchor mounting slots located proximate to said vertical base support member right end of the vertical base support member and said twenty-fourth plurality of fastener apertures being proximate to said vertical base support member rectangular center face right edge of said vertical base support member rectangular center face, wherein said twenty-second plurality of apertures of said vertical base support member rectangular center face configured and adapted for alignment with said tenth plurality of fastener apertures of said second support member face lower end of said second support member face of said second elongated support member, wherein said twenty-third plurality of fastener apertures and said pair of left flange anchor mounting slots of said vertical base support member left flange, and said twenty-fourth plurality of apertures and said pair of right flange anchor mounting slots of said vertical base support member right flange configured and adapted for alignment with said twentieth plurality of fastener apertures of said horizontal support plate front edge and said third and fourth pluralities of anchor mounting slots of said horizontal support plate, and wherein said vertical base support member is designed and adapted for attachment to said base mounting member and to said second support member face lower end of said second support member face of said second elongated support member.

8. A hose and cable support device comprising
a first elongated support member having a length, said first elongated support member comprising
  a first upper end defined by a first trapezoidal top fastener plate disposed within said first upper end of said first elongated support member, said first trapezoidal top fastener plate comprising a first pair of fastener apertures,
  a first lower end defined by a first trapezoidal bottom fastener plate disposed within said first lower end of said first elongated support member, said first trapezoidal bottom fastener plate comprising a second pair of fastener apertures,
  a first support member face traversing said length of said first elongated support member and comprising a first support member face width, a first support member face left edge, a first support member face right edge, a first support member face upper end, and a first support member face lower end, said first support member face lower end having a fifth plurality of fastener apertures,
  a first first lateral side having a width and extending angularly from said first support member face left edge of said first support member face,
  a first second lateral side-having a width and extending angularly from said first support member face right edge of said first support member face,
  a first first lateral flange having a width and extending from said first first lateral side, said first first lateral flange having first first lateral flange upper and lower ends, said first first lateral flange upper end comprising a sixth plurality fastener apertures and said first first lateral flange lower end comprising a seventh plurality of fastener apertures,
  a first second lateral flange having a width and extending from said first second lateral side, said first second lateral flange having first second lateral flange upper and lower ends, said first second lateral flange upper end comprising an eighth plurality of fastener apertures and said first second lateral flange lower end comprising a ninth plurality of fastener apertures, and
  wherein said first elongated support member having generally an open trapezoidal cross-sectional shape;
a second elongated support member having a length equal to said length of said first elongated support member and being connected longitudinally to said first lower end of said first elongated support member, said second elongated support member being an exact duplicate said first elongated support member comprising
  a second upper end defined by a second trapezoidal top fastener plate having a third pair of fastener apertures and being disposed within said second upper end of said second elongated support member, said second trapezoidal top fastener plate of said second upper end of said second elongated support member being fastened to said first trapezoidal bottom fastener plate of said first lower end of said first elongated support member,
  a second lower end defined by a second trapezoidal bottom fastener plate disposed within said second lower end of said second elongated support member, said second trapezoidal bottom fastener plate having a fourth pair of fastener apertures,
  a second support member face traversing said length of said second elongated support member and comprising a second support member face width, a second support member face left edge, a second support member face right edge, second support member face upper end, and a second support member face lower end, said second support member face lower end having a tenth plurality of fastener apertures,
  a second first lateral side having a width and extending angularly from said second support member face left edge of said second support member face,
  a second second lateral side having a width extending angularly from said second support member face right edge of said second support member face,
  a second first lateral flange having a width and extending from said second first lateral side of said second elongated support member, said second first lateral flange having second first lateral flange upper and lower ends, said second first lateral flange upper end comprising an eleventh plurality of fastener apertures and said second first lateral flange lower end comprising a twelfth plurality of fastener apertures,
  a second second lateral flange having a width and extending from said second second lateral side of said second elongated support member, said second second lateral flange having second second lateral flange upper and lower ends, said second second lateral flange upper end comprising a thirteenth plurality of fastener apertures and said second second lateral flange lower end comprising a fourteenth of plurality fastener apertures,
  wherein said second elongated support member having an open trapezoidal cross-sectional shape, and
  wherein said second trapezoidal top fastener plate of said second elongated support member being designed and adapted to engage said first trapezoidal bottom fastener plate of said first elongated support member to couple said first elongated support member to said second elongated support member;
a support member connector plate having a first plurality of fastener apertures being designed and adapted to fasten said first first lateral flange lower end of said first elongated support member and said first second lateral flange lower end of said first elongated support member to said second first lateral flange upper end of said second elongated support member and said second second lateral flange upper end of said second elongated support member, said support member connector plate designed and adapted to provide upright vertical support when connecting said first lower end of said first elongated support member to said second upper end of said second elongated support member;

a universal head mount designed and adapted to be fastened to said first upper end of said first elongated support member, said universal head mount comprising
    a horizontal mounting plate having a horizontal mounting plate left edge, a horizontal mounting plate right edge, and a fifteenth plurality of fastener apertures,
    a left vertical side mounting plate having a sixteenth plurality of fastener apertures extending perpendicularly downward from said horizontal mounting plate left edge of said horizontal mounting plate,
    a right vertical side mounting plate having a seventeenth plurality of fastener apertures extending perpendicularly downward from said horizontal mounting plate right edge of said horizontal mounting plate,
    a left vertical rear mounting plate having an eighteenth plurality of fastener apertures extending perpendicularly inward from said left vertical side mounting plate, and
    a right vertical rear mounting plate having a nineteenth plurality of fastener apertures extending perpendicularly inward from said right vertical side mounting plate,
    wherein said universal head mount being designed and adapted to be coupled to said first trapezoidal top fastener plate of said first elongated support member,
    wherein at least one tensioner being detachably attached to said universal head mount;
a base mounting assembly designed and adapted to secure said second lower end of said second elongated support member of said hose and cable support device to a tractor frame, said base mounting assembly comprising
    a base mounting member having
        a horizontal support plate comprising a horizontal support plate front edge having a twentieth plurality of fastener apertures, a horizontal support plate back edge, a horizontal support plate left end having a third plurality of anchor mounting slots, and a horizontal support plate right end having a fourth plurality of anchor mounting slots, and
        a vertical support plate having a twenty-first plurality of fastener apertures, said vertical support plate extending perpendicularly upward from said horizontal support plate back edge of said horizontal support plate,
    wherein said twenty-first plurality of fastener apertures of said vertical support plate configured and adapted for alignment with said twelfth plurality of fastener apertures of said second first lateral flange lower end and said fourteenth plurality of fastener apertures of said second second lateral flange lower end of said second elongated support member,
    wherein at least two fastener apertures of said twentieth plurality of fastener apertures of said horizontal support plate front edge of said horizontal support plate being configured and adapted for alignment with said fourth pair of fastener apertures of said second trapezoidal bottom fastener plate of said second elongated support member,
    wherein said third plurality of base mounting member anchor mounting slots of said horizontal support plate left end and said fourth plurality of anchor mounting slots of said horizontal support plate right end being configured and adapted to engage a first plurality of anchor fasteners to secure said horizontal support plate to said tractor frame; and
a vertical base support member designed and adapted for attachment to said base mounting member and said second support member lower end, said vertical base support member comprising
    a vertical base support member top edge,
    a vertical base support member bottom edge,
    a vertical base support member rectangular center face having a twenty-second plurality of fastener apertures,
    a vertical base support member left end,
    a vertical base support member right end,
    a vertical base support member left flange being perpendicular to said vertical base support member bottom edge extending from the vertical base support member left end of said vertical base support member to a vertical base support member rectangular center face left edge of said vertical base support member rectangular center face, said vertical base support member left flange having a pair of left flange anchor mounting slots and a twenty-third plurality of fastener apertures, said pair of left flange anchor mounting slots located proximate to said vertical base support member left end of the vertical base support member and said twenty-third plurality of said fastener apertures being proximate to said vertical base support member rectangular center face left edge of said vertical base support member rectangular center face; and
    a vertical base support member right flange being perpendicular to said vertical base support member bottom edge extending from the vertical base support member right end of the vertical base support member to a vertical base support member rectangular center face right edge of said rectangular center face, said vertical base support member right flange having a pair of right flange anchor mounting slots and a twenty-fourth plurality of fastener apertures, said pair of right flange anchor mounting slots located proximate to said vertical base support member right end of the vertical base support member and said twenty-fourth plurality of fastener apertures being proximate to said vertical base support member rectangular center face right edge of said vertical base support member rectangular center face,
    wherein said twenty-second plurality of apertures of said vertical base support member rectangular center face configured and adapted for alignment with said tenth plurality of fastener apertures of said second support member face lower end of said second support member face of said second elongated support member,
    wherein said twenty-third plurality of fastener apertures and said pair of left flange anchor mounting slots of said vertical base support member left flange, and said twenty-fourth plurality of apertures and said pair of right flange anchor mounting slots of said vertical base support member right flange configured and adapted for alignment with said twentieth plurality of fastener apertures of said horizontal support plate front edge and said third and fourth pluralities of anchor mounting slots of said horizontal support plate;

a first plurality of aperture fasteners designed and adapted to engage said second pair of fastener apertures of said first trapezoidal bottom fastener plate and said third pair of fastener apertures of said second trapezoidal top fastener plate to secure said first lower end of said first elongated support member to said second upper end of said second elongated support member, wherein each of said first plurality of aperture fasteners comprising a flange bolt and a flange nut;

a second plurality of aperture fasteners to engage said first plurality fastener apertures to secure said support member connector plate to said first lower end of said first elongated support member and to said second upper end of said second elongated support member, wherein each of said second plurality of aperture fasteners comprising a flange bolt and a flange nut;

a third plurality of aperture fasteners to engage said second plurality of fastener apertures to secure said universal head mount to said first upper end of said first elongated support member, wherein each of said third plurality of aperture fasteners comprising a flange bolt and a flange nut;

a fourth plurality of aperture fasteners to engage said third plurality of fastener apertures to secure said second lower end of said second elongated support member to said base mounting assembly, wherein each of said fourth plurality of aperture fasteners comprising a flange bolt and a flange nut;

a fifth plurality of aperture fasteners to engage said fourth plurality of fastener apertures to secure said base mounting member of said base mounting assembly to said vertical base support member of said base mounting assembly, wherein each of said fifth plurality of aperture fasteners comprising a flange bolt and a flange nut; and a first plurality of anchor fasteners designed and adapted to engage said plurality of base mounting member anchor mounting slots and plurality of vertical base support member anchor mounting slots of said base mounting assembly to secure said hose and cable support device to said tractor frame, wherein each of said anchor fasteners comprising
 a pair of flange bolts and an elongated washer comprising a pair of aperture slots to receive said pair of flange bolts, and
 a pair of flange nuts to engage said pair of flange bolts.

* * * * *